United States Patent [19]

Hermansson

[11] Patent Number: 5,473,976
[45] Date of Patent: Dec. 12, 1995

[54] DOUBLE CONTACT GRILL

[76] Inventor: A. E. Hermansson, 48 Brant Street, Oakville, Ontario, Canada, L6K 2Z4

[21] Appl. No.: 308,905

[22] Filed: Sep. 20, 1994

[51] Int. Cl.⁶ .................................................. A47J 37/06
[52] U.S. Cl. ................. 99/349; 99/379; 99/372
[58] Field of Search ........................... 99/349, 351, 377, 99/378, 379, 372, 389, 390, 391

[56] References Cited

U.S. PATENT DOCUMENTS

| D. 213,931 | 4/1969 | Bardeau | D81/10 |
|---|---|---|---|
| 880,498 | 3/1908 | Bates | 99/377 |
| 1,722,127 | 7/1929 | Burke | 99/379 |
| 1,795,710 | 3/1931 | Clark | 99/379 |
| 2,009,791 | 7/1935 | Shroyer | 99/377 |
| 2,632,379 | 3/1953 | Kudo | 99/375 |
| 2,719,903 | 10/1955 | Oertli | 219/19 |
| 3,312,161 | 4/1967 | Nanna | 99/377 |
| 4,483,239 | 11/1984 | Mueller et al. | 99/349 |
| 4,484,516 | 11/1984 | Bimman | 99/349 |
| 4,690,044 | 9/1987 | Verkler | 99/419 |
| 4,763,571 | 8/1988 | Bergling | 99/349 |
| 4,838,153 | 6/1989 | Escamilla et al. | 99/349 |
| 4,852,545 | 8/1989 | Sherman et al. | 126/39 H |
| 5,197,377 | 3/1993 | Jennings et al. | 99/349 |

Primary Examiner—David Scherbel
Assistant Examiner—Reginald L. Alexander
Attorney, Agent, or Firm—Bereskin & Parr

[57] ABSTRACT

A double contact grill for cooking foods, the grill comprising: top and bottom cooking plates having heating elements; a pivotal connection between the bottom cooking plate and the top cooking plate wherein the top cooking plate is moveable between a lower position adjacent to the bottom cooking plate and a raised position; and a counterbalance disposed on an opposite side of the pivotal connection from the side of the pivotal connection on which the top plate is disposed, wherein the counterbalance is of a weight and a position to provide a seating force causing the top cooking plate to seat against the bottom cooking plate when the top cooking plate is in the lowered position and wherein when the top cooking plate is in the raised position the counterbalance provides a resisting force to maintain the top cooking plate in the upright position.

21 Claims, 5 Drawing Sheets

DOUBLE CONTACT GRILL

FIELD OF THE INVENTION

This invention relates generally to the field of cooking appliances, and more particularly to cooking appliances which are in the form of a grill for cooking food on. In particular this invention relates to cooking grills which have an upper cooking plate and a lower cooking plate which can be brought in close proximity to simultaneously cook both sides of a food product and which are generally known as double contact or sometimes high speed grills.

BACKGROUND OF THE INVENTION

In cooking appliances, especially for commercial or fast food applications, there is a desire to meet two somewhat contradictory goals. The first goal is that the operators of fast food outlets wish to serve as many customers as quickly as possible in order to maximize client satisfaction, and utilization of staff and equipment, to thereby maximize profits. However, there is also a need to ensure that the quality of cooking, in terms of thoroughness of cooked product, is not sacrificed for speed of service of customers. More particularly for some types of food, such as hamburgers, improper cooking can lead to unsanitary and unsafe food being served to customers which can cause sickness and even death in some circumstances. This must be avoided.

One way to speed up cooking, without sacrificing the sanitizing effects that proper cooking has on food, is to cook the food from opposite sides at the same time. This may be accomplished by using a cooking device known as a double contact grill. Such grills have top cooking plates and bottom cooking plates which are attached, for example by means of a hinge or pivot at the back, to allow the cooking plates to be brought together onto food to cook the food and then brought apart from food to allow the cooked food to be removed and served, and for fresh, uncooked food to be placed on the grill, for cooking.

In the past there have been numerous attempts to design such a grill that is on the one hand easy to use and on the other hand practical. However there are several problems with the conventional designs. For example, to alleviate the force that would otherwise be required to lift and lower the top cooking plate there is often provided a spring at the hinge or rear pivot point. Unfortunately springs tend to wear over time, can be difficult to calibrate precisely and are prone to getting dirty, oily and the like. Springs are very difficult to clean. Additionally in such prior designs, there is a problem with the controls, which are typically located below the cooking surfaces and thus are prone to getting covered in grease drippings, splatters and the like. This can create safety problems as well as sanitary problems.

One alternative to using springs is to allow the upper plate to ride in a track, with the raised position being defined by resting the upper plate in a catch in the track. However this can be unstable and requires too much strength to lift larger sized grills.

Another alternative is to use counterweights as proposed in U.S. Pat. No. 4,763,571 to Bergling et al. However the counterweights that are shown in this patent are of a size and a position that they always urge the upper plate into the upper or open position. To keep the cooking plate in contact with the food requires a special catch mechanism which is activated by a timer. Upon a predetermined time elapsing the timer release the catch allowing the plate to pivot upwardly. A cooking weight is provided for, by allowing the upper plate to be free floating relative to the food being cooked. In this manner the full weight of the cooking plate is pressed onto the food. Because this is such a weight, spacers are required to prevent the food from being completely squashed. Different foods require different sized spacers. The spacers have to be inserted and removed according to the type of food being cooked. An inappropriately small spacer results in squashed food. Worse an inappropriately large spacer results in the food not being thoroughly cooked which can lead to sickness, and in some cases death to the person who eats the improperly cooked food.

While the Bergling device eliminates the need for springs, it introduces many complications, including timing devices, catches, spacers, and the prospect of the cooking plate rising up unexpectedly and coming into contact and burning someone. Further, the amount of seating force of the grill on the food is so great as to squish the food. These and other problems make this design generally impractical.

SUMMARY OF THE INVENTION

Therefore what is required is a double contact grill that avoids the use of springs one the one hand, but avoids the complications and problems of a permanently lift up upper grill on the other hand. Preferably such a device would have a reasonable and predetermined seating force on the food to be cooked and would not require relatively unskilled workers such as cooks to insert and remove spacers for foods of different thicknesses. Also the device would preferably be simple easy to clean and operate and yet would provide the desired double sided fast cooking of the double contact grills.

There is provided according to the present invention:

A double contact grill for cooking foods, the grill comprising:

a bottom cooking plate having a heating element, support means for supporting the bottom cooking plate on a surface;

a top cooking plate having a heating element;

control means for said heating elements;

a pivotal connection between the bottom cooking plate and the top cooking plate wherein the top cooking plate is moveable between a lower position adjacent to the bottom cooking plate and a raised position; and a counterbalance disposed on an opposite side of said pivotal connection from the side of said pivotal connection on which said top plate is disposed, wherein said counterbalance is of a weight and a position to provide a seating force causing said top cooking plate to seat against said bottom cooking plate when said top cooking plate is in the lowered position and wherein when said top cooking plate is in the raised position said counterbalance provides a resisting force to maintain the top cooking plate in the upright position.

BRIEF DESCRIPTION OF THE DRAWINGS

Reference will now be made to preferred embodiments of the invention with reference to the attached drawings which, by way of example only, illustrate the preferred features of the invention and in which.

DETAILED DESCRIPTION OF THE PREFERRED EMBODIMENTS

Figure 1:
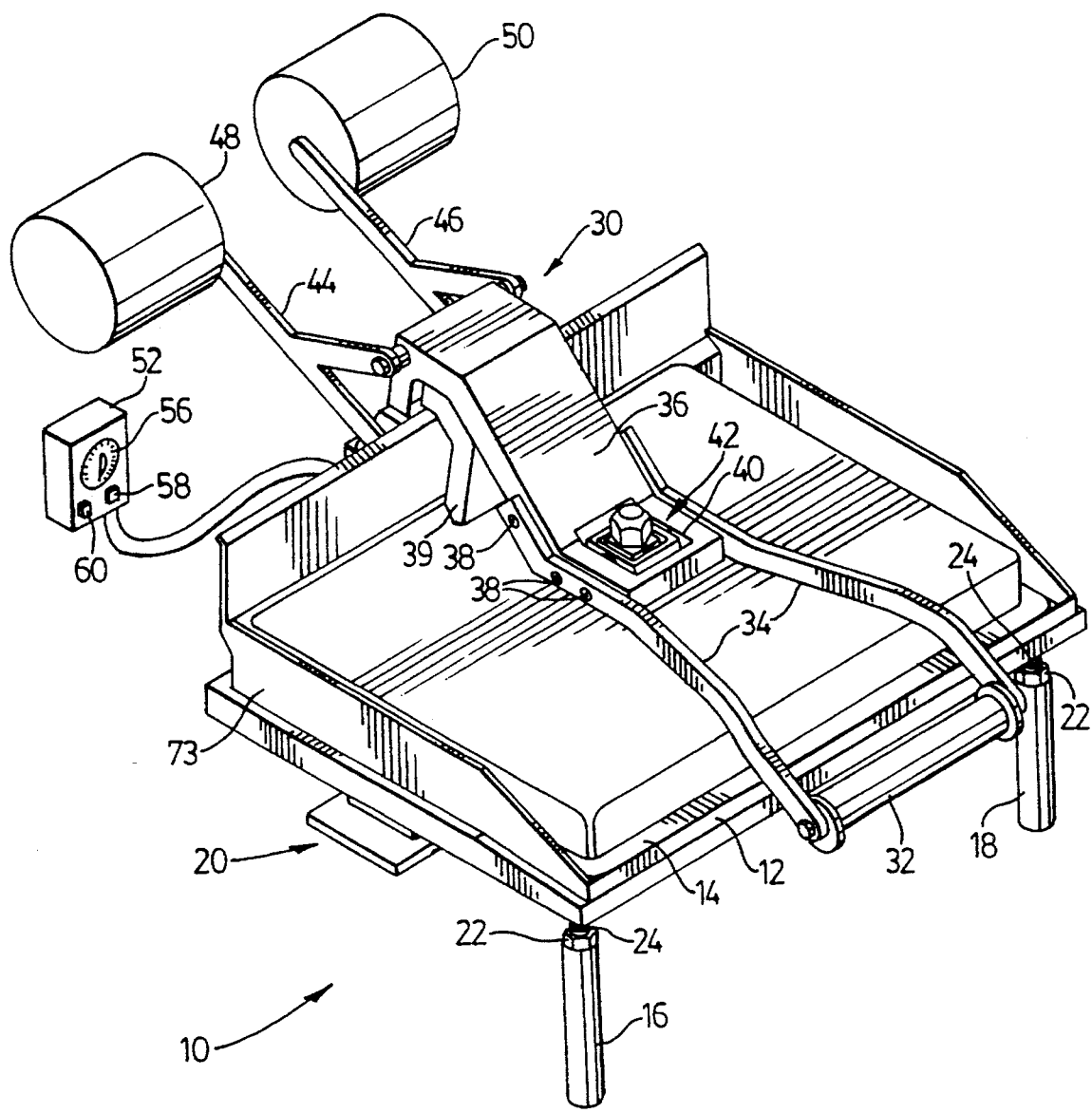
FIG. 1 is a perspective view from in front of a double contact grill according to the present invention.

In FIG. 1 there is shown a double contact grill which is generally indicated as 10. The grill 10 includes a bottom cooking plate 12 and a top cooking plate 14. Each of the top and bottom cooking plates 12,14 will have a cooking surface, of which there are many, and on the opposite side from the cooking surface will be a resistive heating element. Such elements may be attached to the backs of the cooking plates but are preferably cast into the middle of the plates to allow for an even heat to be delivered to said cooking surface. The bottom cooking plate is supported by two front legs 16,18 and one rear leg 20. Collectively these legs may be referred to as a support means for the bottom cooking plate 12. It will be noted that each of the legs 16, 18 are provided with an adjustment nut 22 and a threaded rod 24 so that the height of the legs can be adjusted to level the grill 10 as needed.

A pivotal connection is also shown in FIG. 1 at 30. The operation of the pivotal connection 30 is described in more detail below in association with the descriptions of FIGS. 2 and 3. A handle is shown at 32, attached to opposed handle brackets 34. The handle brackets 34 are in turn attached to a support member 36, by means of screws 38. An opening 40 is formed at one end of the support member 38, in which is located a pivoting connection 42. The connection 42 is described in greater detail below. Also shown is a stop 39, which is attached to an underside of the support member 36.

At a rear end of the support member are located a pair of opposed counterweight carrying elements 44, 46. Also shown are a pair of counterweights 48, 50 on the respective elements 44, 46. The preferred form of the counterweights is lead filled tubes, which provide a significant mass in a small volume. Also shown are an electronic control at 52, and the flexible armoured connecting electrical cable 54. The controller includes a thermostat 56, an on/off switch 58 and a timer 60. It will be appreciated by those skilled in the art that other controls, as needed or desired in the cooking industry can be added to the controls already shown.

Figure 2:
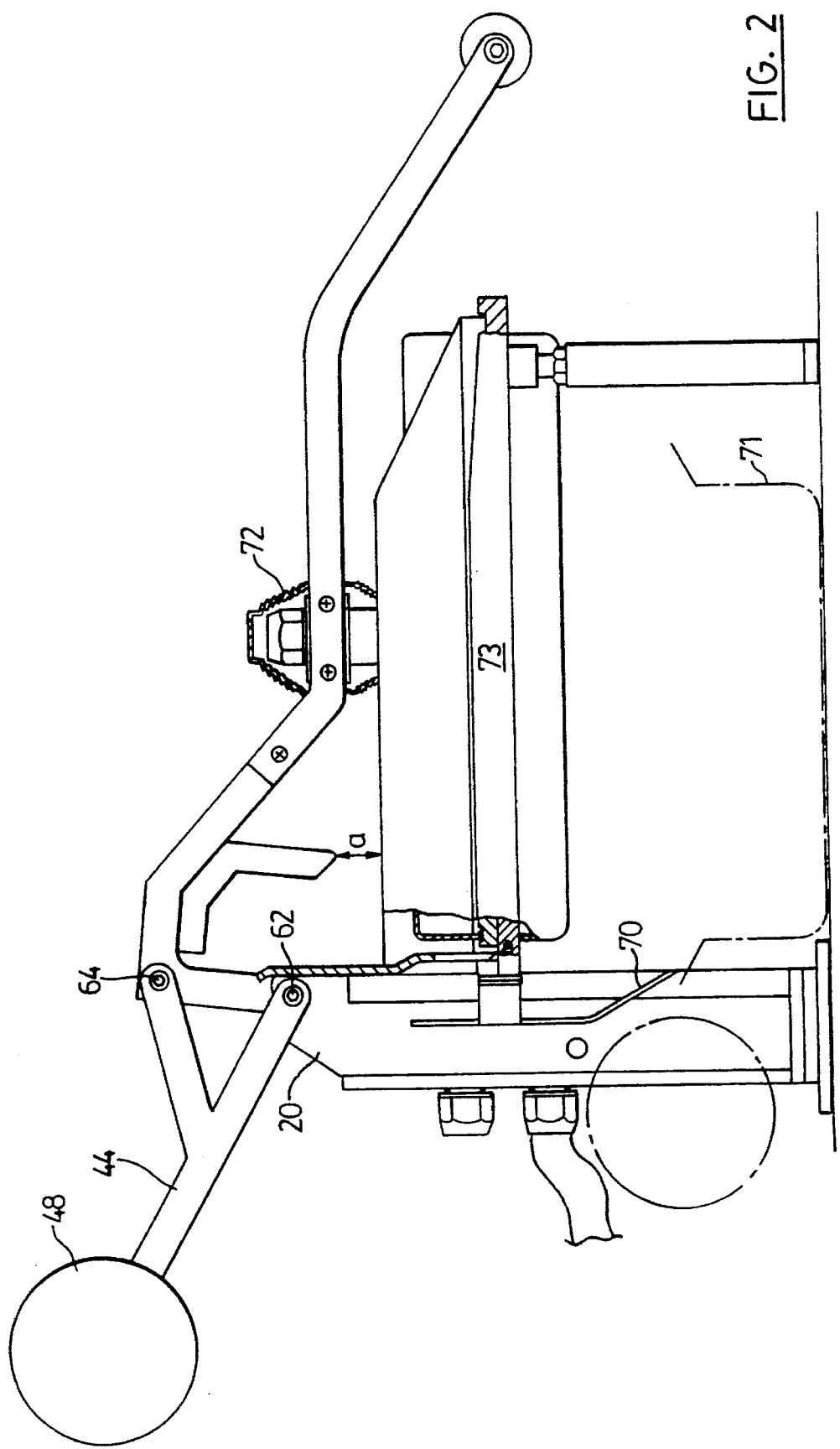
FIG. 2 is a side view of the double contact grill of FIG. 1.

FIG. 2 shows the grill 10 from in side elevation. The pivot 30 can now be better understood. the counter weight carrying elements 44, 46 are shown with two attachments at the end remote from the counter weights. These are shown as 62 and 64 respectively. In each case there is a bolt which extends through the element 44, 46, and then into the support member 38. Washers may be provided to allow the easy pivoting of the elements relative to each other. It will be noted that the lower bolt 62 passes through the rear leg 20 as well. Thus the lower bolt 62 pivotally connects the handle to the support leg 20, as well as the element 44. It will be appreciated that while reference is made to only one side herein the other side would be identical. Also, while the element 44 is shown as a Y-shaped element, it could also be formed from a solid plate, without the V-shaped opening between 62 and 64. This may be preferred for strength and durability.

Also shown in FIG. 2 is a grease drip shield 70 which is preferably removable. When in use, a grease container shown in dotted outline as 71 would be positioned below the drip shield to catch the grease flowing off the grill. The height of the front legs can be adjusted to provide a reasonable front to back slope to the bottom grill to ensure that unwanted grease flows off the grill. The container can be easily removed and cleaned as it is filled. To facilitate this flow of grease, a splash guard, which is removable for easy cleaning, is provided as shown at 73. The splash guard 73 is lower at the front, and gradually becomes higher toward the rear as shown, to help prevent splashes.

It will now be appreciated how the electronic controls at the end of the flexible wire can facilitate use of the grill 10. Instead of having the controls mounted below the lower plate as in most designs, the controls may be wall mounted, well away from the grill itself, allowing the controls to remain clean and safe, while at the same time providing for easy access to underneath the grill to facilitate the grease removal. Additionally much fabrication expense is saved by not having to fabricate a grease shield which is required in conventional designs having controls located under the grill.

Figure 3:
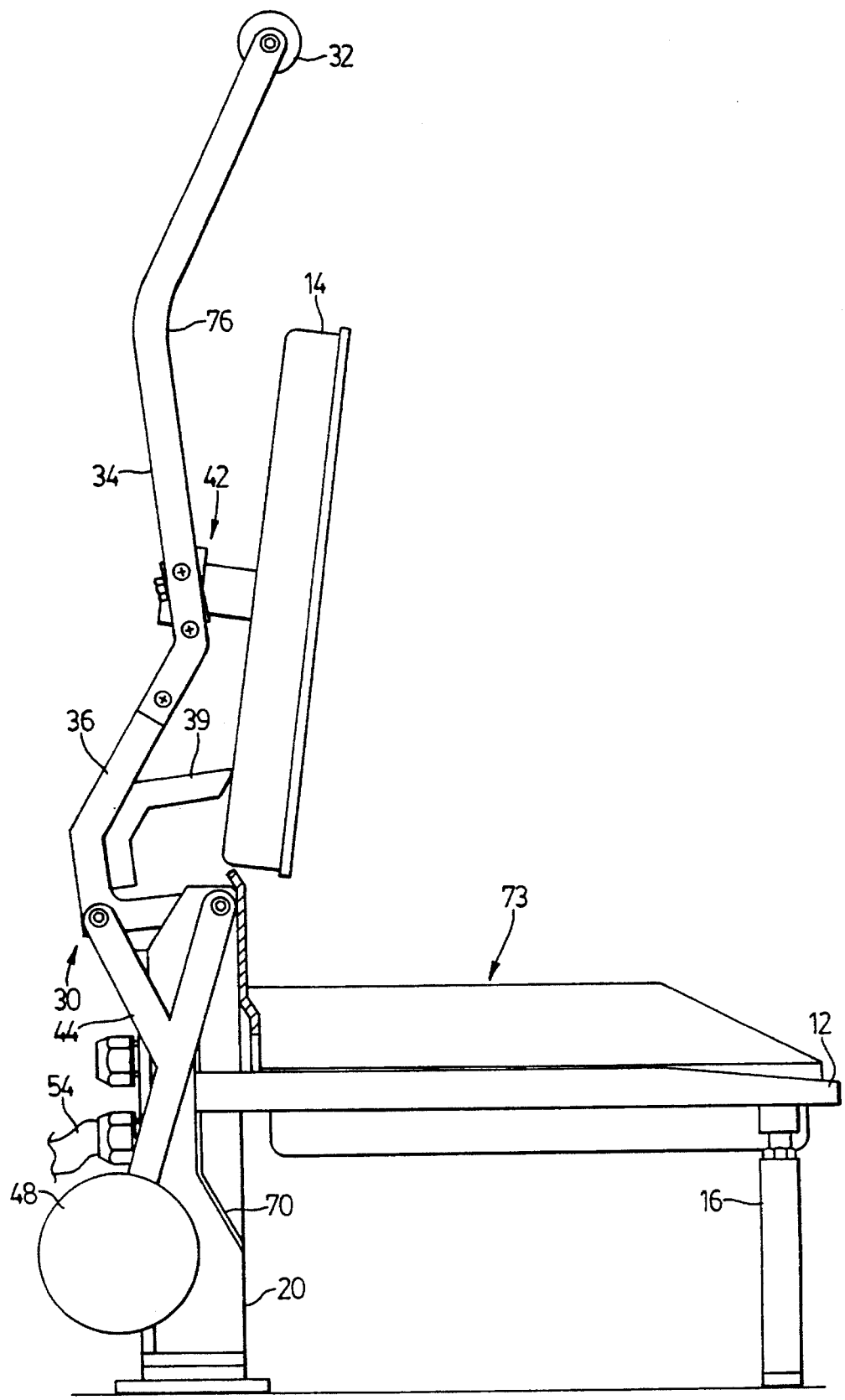
FIG. 3 is a side view of the double contact grill of FIG. 2 in an open or raised position.

FIG. 3 shows the grill with the upper or top cooking plate 14 in the raised position. In this position the food can be placed onto bottom cooking plate 12 or taken off of the plate 12 free of interference from the top plate 14. It will be noted that the handle brackets 34 are formed with a curved part 76. To avoid having to reach over behind the hot upper cooking plate 14 when the grill is in the raised position it is necessary to carry the handle forward to the front as shown.

It can now be appreciated how the elements cooperate to act as a counterweight means to allow the top cooking plate 14 to be raised and lowered. The first point to note is that the positioning of the counterweights and the weight of the counterweights can be varied while keeping the same desired result. The counterbalancing force provided by the counterweights is calculated as the weight times the lateral distance (or the horizontal projection of the distance to the centre of gravity which is referred to as the moment arm) the weight is located away from the pivot point. Either the weight or the distance can be varied to achieve the desired effect.

The desired effect for the counterweight means is that when in the down position the counterweights should be exerting slightly less force than the weight of the other elements on the opposite side of the pivot point 30. In this manner there will be a small seating force directing the top cooking plate 14 onto the bottom cooking plate 12. This will help in keeping good contact with the food being cooked, to ensure thorough cooking, but need not be so great as to require spacers to prevent the food from being squashed beyond recognition. For example, the cooking weight can be between one half to about three pounds although satisfactory results have been achieved with about one pound of seating force.

It will be appreciated that the counterweights, when the top cooking plate is in the raised position, generate more force upon being displaced than the top cooking plate. Therefore when the top cooking plate is in the raised position, the counter weights will tend to return the top cooking plate to the upright position. This prevents any sudden unwanted lowering of the top cooking plate. As the handle is pulled down, the mass of the top plate side of the pivot point in essence moves further and further away from the pivot point. Since the further away the mass is the more moment it exerts, the upper cooking plate and the counterweights will at some angle of inclination be perfectly balanced. This point is referred to as the balance point and is defined simply as the point at which the combined weight times the moment arm on one side of the pivot point is equal to the combined weight times moment arm on the other side of the pivot point. As the handle is pulled further down, the moment arm for the top cooking plate becomes longer, relative to the pivot point, in effect causing there to be a seating or downward force on the top plate. This force is at its maximum at the point when the centre of gravity of the cooking plate side of the pivot is furthest away from the pivot point, or when the handle is generally horizontal.

It can now be appreciated that the present invention provides a device that automatically retains the top grill in a raised position when the grill is in the raised position, and which automatically provides a seating or cooking weight when the grill is in the lowered position, without the need for any catches, timers or other mechanical elements. All that is required is to ensure that the centre of gravity of the upper cooking plate is further from the pivot point from the centre of gravity of the counterweights when the top plate is in the lowered position, so that the maximum moment exerted by the cooking plate side of the pivot can exceed the maximum moment exerted by the counterweights.

It will be appreciated that the foregoing provides a easy to use upper cooking plate 14, because as the cooking plate moves through the balance point the weight of the upper grill will be zero. Thus during the lifting cycle, the feel of the upper cooking plate will be, a slight weight, in the most preferred embodiment about one pound, which gradually becomes lighter until the weight disappears at the balance point, after which the handle begins to gently pull towards the fully raised position. The reverse will be true on the downward cycle. It will be appreciated that other ways may be used to achieve the desired results, including using sliding weights or the like to attain similar weight transfer at the handle during the lifting and lowering cycle. However these are less preferred, because of the increased complexity and the introduction of moving parts which eventually might fail. In some circumstances it might be appropriate to provide an adjustable weight means which can be move slightly closer or slightly further from the pivot point on either side of the pivot point. This would allow operators to vary the seating force of the top grill in the lowered position to suit individual cooking needs. Such a adjustment could for example be a weighted nut on a threaded rod on either side of the pivot point.

Figure 4:
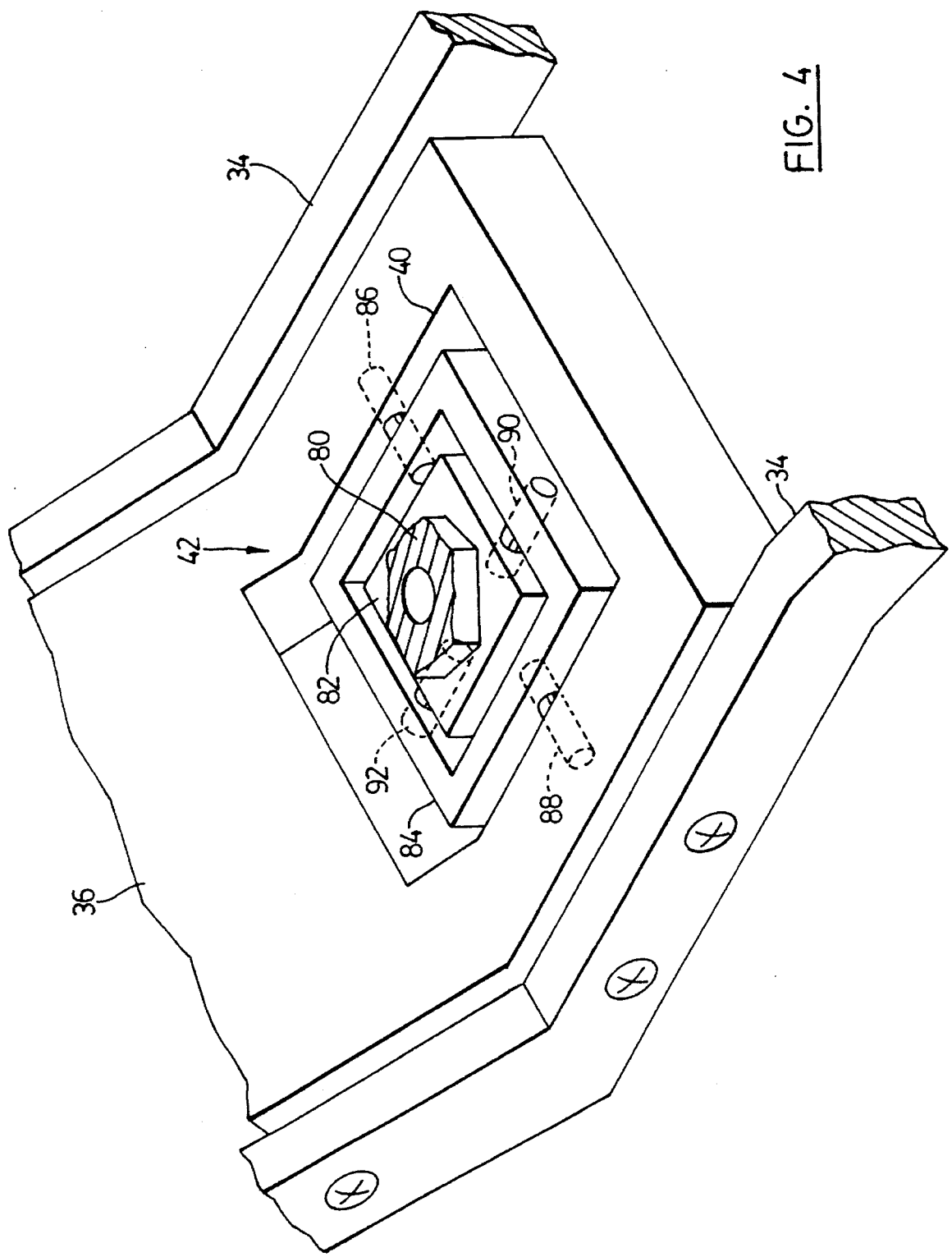
FIG. 4 is a detail view of a portion of the double contact grill of FIG. 1.

Also shown in FIG. 2 is a rubber seal 72 to protect the pivot point 42 from becoming soiled. The seal is preferably corrugated to provide flexibility. The seal is desirable to prevent food from getting into the workings of pivot joint 42, which will now be described in detail in reference to FIG. 4. The seal 72 could be replaced with a steel or metal shroud also.

For ease of illustration, a nut 80 is shown partially broken away. The nut 80 is carried on a middle platform 82, which is surrounded by a ring 84, which is located in the opening 40. A pair of opposed pivot pins 86, 88 extend between the element 36 and the ring 84. In this manner the ring 84 can pivot front to back relative to the element 36. A second pair of opposed pins 90, 92 extend between middle platform 82 and ring 84 which allow the middle platform 82 to pivot side to side relative to the ring 84. It will be appreciated by those skilled in the art that the pivot 42 is thus a form of universal joint which allows the top cooking plate to pivot in any direction relative to the handle brackets 34. While this type of universal joint is preferred, others may also be used, such as a ball and socket type. The purpose of the universal joint 42 is to allow the top cooking plate to be brought into more full contact with food being cooked which may be uneven in nature such as a fish or the like.

Figure 5:
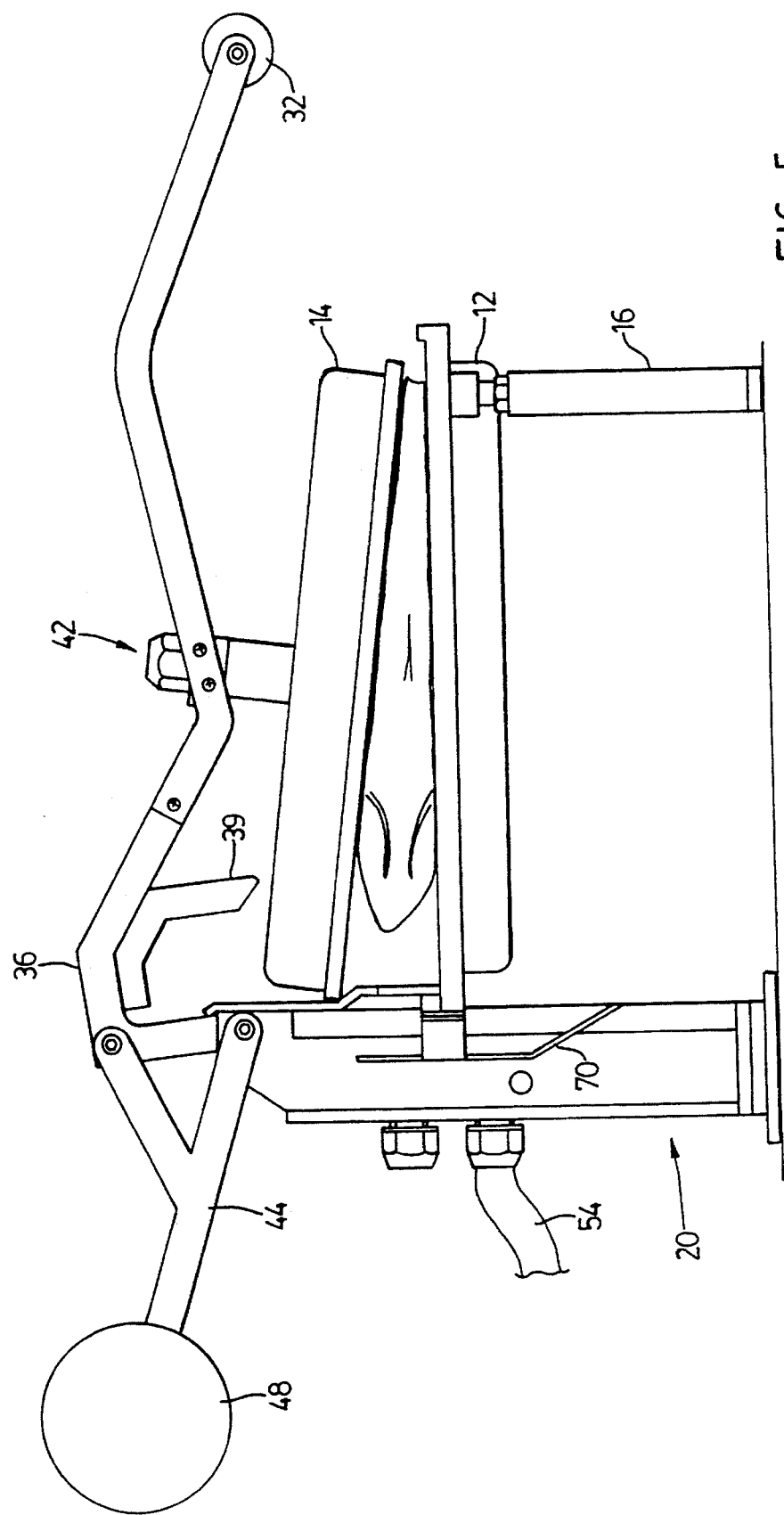
FIG. 5 is a side view of the grill of FIG. 1 with food to be cooked placed on the grill.

An example of this is shown in FIG. 5.

It will now be appreciated that the stop 39 provides a way of controlling the movement of the top cooking plate relative to the bottom cooking plate. More specifically, when the top cooking plate is in the lowered position, as shown in FIG. 2, there is a gap, shown as "a" between the end of the stop 34 and the top cooking plate 14. As the top cooking plate is raised up, by reason of the pivot 42, the top cooking plate will rise horizontally, until the distance "a" has been closed. When the stop 39 contacts top cooking plate 14, it will cause the top cooking plate to begin to pivot and will thus cause the top cooking plate to rise away from the bottom cooking plate. The distance "a" can be made to any suitable distance, but satisfactory results have been achieved where "a" is made about two to three inches long. This will the accommodate most of the food thicknesses to be cooked in this type of grill. Other dimensions could also be used, where particularly thick food items were common. The preferred material for the stop 39 is a phenolic or heat resistant plastic material, although metals such as aluminum could also be used.

It will be appreciated by those skilled in the art that the foregoing description is with respect to preferred embodiments of the invention and that various modification can be made without departing from the broad scope of the invention as defined in the appended claims. Some of these variations have been discussed above and others will be apparent. The scope of the invention is to be interpreted with respect to the attached claims.

I claim:

1. A double contact grill for cooking foods, the grill comprising:

a bottom cooking plate having a heating element;

support means for supporting the bottom cooking plate on a surface;

a top cooking plate having a heating element;

control means for said heating elements;

a pivotal connection between the bottom cooking plate and the top cooking plate wherein the top cooking plate is moveable between a lower position adjacent to the bottom cooking plate and a raised position; and a counterbalance disposed on an opposite side of said pivotal connection from the side of said pivotal connection on which said top plate is disposed, wherein said counterbalance is of a weight and a position to provide a seating force causing said top cooking plate to seat against said bottom cooking plate when said top cooking plate is in the lowered position and wherein when said top cooking plate is in the raised position said counterbalance provides a resisting force to maintain the top cooking plate in the upright position.

2. A double contact grill for cooking foods as claimed in claim 1, wherein said top cooking plate includes a handle means for moving said top cooking plate between the raised and lowered positions.

3. A double contact grill for cooking foods as claimed in claim 2 wherein said top cooking plate and said handle are balanced by said counterweight at a balance point, wherein said balance point is located at a position between said raised position and said lowered position.

4. A double contact grill for cooking foods as claimed in claim 3 wherein when said top cooking plate is in a position between the raised position and the balance point said counterweight exerts more force than said handle and said top cooking plate urging the top cooking plate back to the fully raised position.

5. A double contact grill for cooking foods as claimed in claim 3 wherein when the top cooking plate is in a position between the balance point and the lowered position the top cooking plate and the handle exert more force than said counterweight, urging the top cooking plate onto the bottom cooking plate.

6. A double contact grill for cooking foods as claimed in claim 1 wherein said seating force is between one half and three pounds.

7. A double contact grill for cooking foods as claimed in claim 1 wherein said seating force is about one pound.

8. A double contact grill for cooking foods as claimed in claim 2 wherein said top cooking plate is pivotally attached to said handle and said top cooking plate can pivot to lie in contact with food having an angled upper surface.

9. A double contact grill for cooking foods as claimed in claim 8 wherein said handle includes a stop located between said handle pivot point and said pivotal connection to cause said top pivot plate to pivot as said top cooking plate is being raised.

10. A double contact grill for cooking foods as claimed in claim 9 wherein said stop does not engage said top cooking plate until said top cooking plate is a predetermined distance away from said bottom cooking plate, wherein said top cooking plate is permitted to move vertically relative to said bottom cooking plate across said predetermined distance.

11. A double contact grill for cooking foods as claimed in claim 1 wherein said control means comprises a control box including one or more of a timer, temperature controls and on/off switches.

12. A double contact grill for cooking foods as claimed in claim 11 wherein said control means comprises a control box, attached to said top and bottom cooking plates by a flexible electrical connector, wherein said control box may be mounted remotely from said top and bottom cooking plates.

13. A double contact grill for cooking foods, said grill comprising:
   a bottom cooking plate;
   support means for said bottom cooking plate;
   a top cooking plate;
   a pivot point between said top cooking plate and said bottom cooking plate; and
   counterweight means disposed on an opposite side of said pivot point from the side of said pivotal connection on which said top cooking plate is disposed wherein when said top cooking plate is in a raised position said counterweight means acts to retain said top cooking plate in said raised position and when said top cooking plate is in a lowered position, said counterweight means acts to retain said top cooking plate in said lowered position.

14. A double contact grill for cooking foods as claimed in claim 13 wherein said counterweight means comprises a counterweight having a first weight at a first centre of gravity located a first distance away from said pivot point and wherein said top grill has a second weight at a second centre of gravity located a second distance away from said pivot point, wherein when said top grill is in said lowered position, said second distance times said second weight is greater than said first weight times said first distance.

15. A double contact grill for cooking foods as claimed in claim 14 further including a balance point at a location between said raised position and said lowered position wherein at said balance point, said first weight times a horizontal projection of said first distance equals said second weight times a horizontal projection of said second distance.

16. A double contact grill for cooking foods as claimed in claim 15 wherein said support means includes a level adjuster, and said grill includes a drip shield.

17. A double contact grill for cooking foods as claimed in claim 16 wherein said level adjuster can be adjusted to cause liquid to flow off said bottom grill and onto said drip shield.

18. A double contact grill for cooking foods as claimed in claim 17 wherein said grill includes resistant heating elements in each of said top and bottom grills, and a control means comprising one or more of an on/off switch, a timer and a thermostat.

19. A double contact grill for cooking foods as claimed in claim 18 wherein said control means comprises a separately mountable box connected to said grill by a flexible electrical cable.

20. A double contact grill for cooking foods as claimed in claim 13 further including a handle and wherein said top cooking plate is pivotally connected to said handle to allow said top cooking plate to angle onto foods being cooked having angled upper surfaces.

21. A double contact grill for cooking foods as claimed in claim 20 wherein said grill further includes a rubber seal to cover said pivotal connection between said handle and said top cooking plate.

* * * * *